US010621749B2

(12) United States Patent
Cho et al.

(10) Patent No.: US 10,621,749 B2
(45) Date of Patent: Apr. 14, 2020

(54) TERMINAL DETECTING AND DISPLAYING OBJECT POSITION

(71) Applicant: LG ELECTRONICS INC., Seoul (KR)

(72) Inventors: Taehoon Cho, Seoul (KR); Jie Seol, Seoul (KR)

(73) Assignee: LG ELECTRONICS INC., Seoul (KR)

(*) Notice: Subject to any disclaimer, the term of this patent is extended or adjusted under 35 U.S.C. 154(b) by 188 days.

(21) Appl. No.: 15/744,356

(22) PCT Filed: Aug. 18, 2015

(86) PCT No.: PCT/KR2015/008574
§ 371 (c)(1),
(2) Date: Jan. 12, 2018

(87) PCT Pub. No.: WO2017/010602
PCT Pub. Date: Jan. 19, 2017

(65) Prior Publication Data
US 2018/0204350 A1 Jul. 19, 2018

(30) Foreign Application Priority Data
Jul. 13, 2015 (KR) .................. 10-2015-0099269

(51) Int. Cl.
H04N 1/32 (2006.01)
H04N 1/00 (2006.01)
(Continued)

(52) U.S. Cl.
CPC .................. *G06T 7/74* (2017.01); *G06T 7/97* (2017.01); *H04N 1/00403* (2013.01);
(Continued)

(58) Field of Classification Search
None
See application file for complete search history.

(56) References Cited

U.S. PATENT DOCUMENTS 8,209,240 B2 6/2012 Ryu et al.
2006/0220982 A1* 10/2006 Ueda ................. G06F 21/35
345/1.1
2012/0326611 A1* 12/2012 Nanahara ........... H05B 37/0227
315/151

FOREIGN PATENT DOCUMENTS

KR 10-0861133 B1 9/2008
KR 10-2010-0054179 A 5/2010
(Continued)

Primary Examiner — Idowu O Osifade
(74) Attorney, Agent, or Firm — Birch, Stewart, Kolasch & Birch, LLP

(57) ABSTRACT

The present invention is to provide a terminal for performing a secretarial function for assisting a person's memory at home or in a company, and a system comprising the same. The terminal comprises: a camera module configured to capture an image of a predetermined space when a person's motion in the predetermined space is detected; and a memory for storing the image captured by the camera module, wherein when a user request is received, the position of an object corresponding to the user request is detected using the image stored in the memory, and guide information can be outputted in at least one manner of a visual manner, an auditory manner and a tactile manner so that the detected position is guided.

17 Claims, 16 Drawing Sheets

(51) Int. Cl.
*G06T 7/00* (2017.01)
*G06T 7/73* (2017.01)

(52) U.S. Cl.
CPC . *H04N 1/32122* (2013.01); *H04N 2201/3253* (2013.01); *H04N 2201/3273* (2013.01)

(56) References Cited

FOREIGN PATENT DOCUMENTS

KR 10-2011-0077874 A 7/2011
KR 10-2012-0017107 A 2/2012

\* cited by examiner

FIG. 12
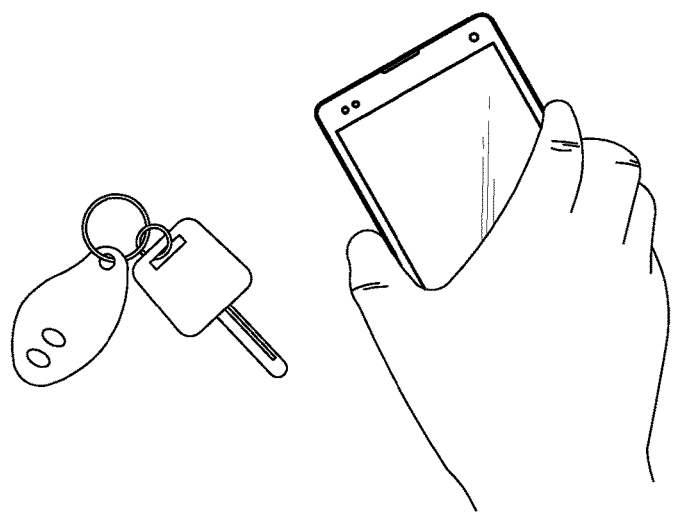
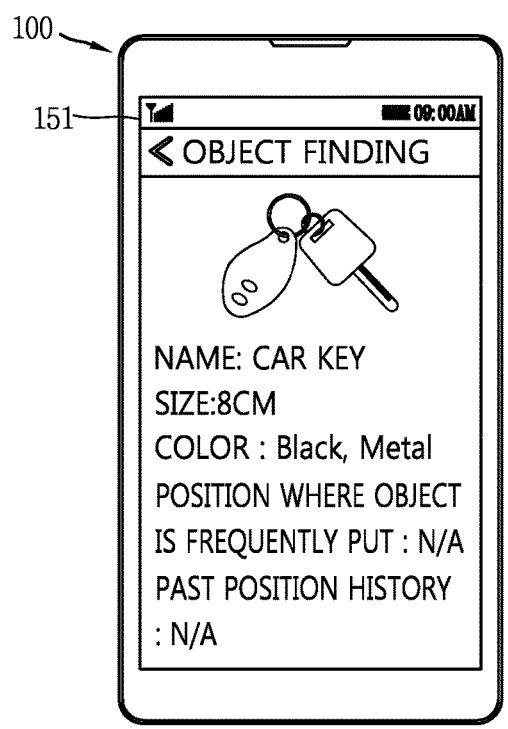
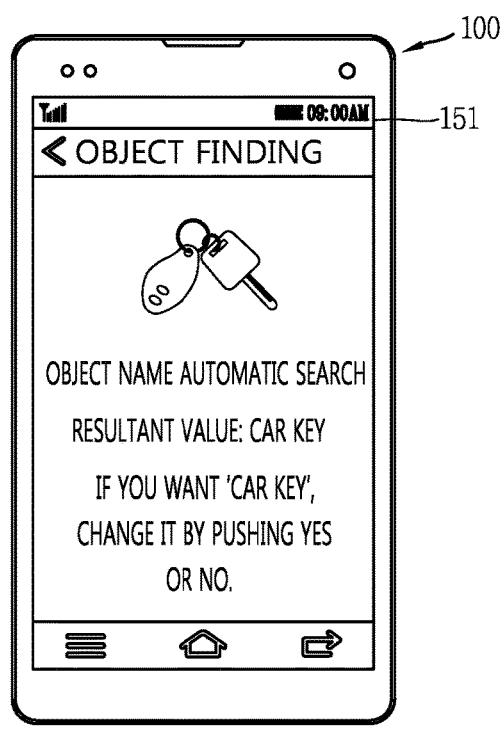

TERMINAL DETECTING AND DISPLAYING OBJECT POSITION

CROSS REFERENCE TO RELATED APPLICATIONS

This application is the National Phase of PCT International Application No. PCT/KR2015/008574, filed on Aug. 18, 2015, which claims priority under 35 U.S.C. 119(a) to Patent Application No. 10-2015-0099269, filed in Republic of Korea on Jul. 13, 2015, all of which are hereby expressly incorporated by reference into the present application.

TECHNICAL FIELD

The present invention relates to a terminal having a display configured to output visual information and a system comprising the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As the mobile terminal becomes multifunctional, it is implemented as a multimedia player having complicated functions such as capturing images or videos, playing music or videos, playing games, and receiving broadcastings. Various attempts have been made to implement complicated functions in such a multimedia device by means of hardware or software.

Meanwhile, a ubiquitous age has come, in which a user may freely access a network regardless of a place without being conscious of the network or a computer. Also, an internet of things environment in which things in daily life are mutually connected by a wire or wireless network to share information has been constructed. Things may be connected to the network in various fields such as healthcare, remote metering, smart home, and smart car as well as home appliances and electronic devices to share information.

In accordance with the development, a plurality of devices arranged in a predetermined space mutually share their information, whereby information meaningful for a user may be generated for at least one event generated in the predetermined space, and the generated information may be provided to the user.

Meanwhile, the user may input a search word to the terminal and execute a search function for the input search word to quickly search for information corresponding to the input search word if information desired to be used by the user is stored in the terminal. However, if the user looks for a specific object in a predetermined space, inconvenience occurs in that the user should check the predetermined space in detail to look for the specific object. For example, the user conveniently controls an operation of a device by using a remote controller but may indifferently leave the remote controller as it is after the device is operated. In this case, the remote controller may be arranged under a chair, table or bed, or may be stuck between chairs, whereby inconvenience may occur in that the user should find everywhere if the user desires to use the remote controller. Also, the user may look for the remote controller after putting the remote controller in a random position.

Techniques in which a positioning device is separately installed in the remote controller have been developed. However, the user desires to be quickly guided positions of various objects such as a car key and a wallet as well as the remote controller, and a problem occurs in that a positioning device cannot be installed in all objects unlike the remote controller.

DISCLOSURE OF THE INVENTION

Therefore, an object of the present invention is to substantially obviate one or more problems due to limitations and disadvantages of the related art.

Another object of the present invention is to provide a terminal that performs an assistance function for assisting a memory of a person in a home or company, and a system comprising the same.

Still another object of the present invention is to provide a terminal that may guide positions of various objects arranged in predetermined spaces in real-time in accordance with a request of a user while minimizing the cost, and a system comprising the same.

More specifically, the present invention provides a terminal for detecting a position of an object arranged in a predetermined space by using a camera configured to take the predetermined space or an external device comprising the camera.

To achieve these and other advantages and in accordance with the purpose of the invention, as embodied and broadly described herein, a terminal according to one embodiment of the present invention comprises a camera module configured to take an image for a predetermined space if a motion of a person is sensed from the predetermined space; a memory for storing the image taken from the camera module; and a controller for detecting a position of an object corresponding to a user request by using the image stored in the memory if the user request is received, and outputting guide information for guiding the detected position in at least one of visual, auditory and tactile manners.

In one embodiment, the controller may control the memory to store the taken image only if the taken image fulfills a preset condition.

In one embodiment, the camera module may take a first image for the predetermined space if the motion of the person is sensed from the predetermined space and take a second image for the predetermined space if the motion of the person disappears, and the controller may store at least one of the first and second images in the memory if the first and second images fulfills the preset condition.

In one embodiment, the controller may detect an object of which position is changed, from the predetermined space by comparing the first and second images with each other, and may store the at least one of the first and second images in the memory in accordance with the detected result or not.

In one embodiment, the controller may store the at least one of the first and second images in the memory if the object of which position is changed is detected from the predetermined space, and may not store the first and second images in the memory if not so.

In one embodiment, the controller may store the at least one of the first and second images if a position of a preset object is changed in the predetermined space, and may not store the at least one in the memory if not so.

In one embodiment, the terminal may further comprise a display unit, wherein the controller may control the display unit to display a plane view illustrating the predetermined space if the user request is received, and may output a graphic object to a point where an object corresponding to the user request on the plane view is located.

In one embodiment, the graphic object may have a shape varied in accordance with a type of the object corresponding to the user request.

In one embodiment, the terminal may further comprise a display unit, wherein the controller may control the display unit to display the taken image and highlight one area of a full area of the taken image, in which the object corresponding to the user request is included.

In one embodiment, if the user request is received, the controller may set the point where the terminal is located, to a departure place and set the position of the object corresponding to the user request to an arrival place, and the guide information may be path guide information for guiding a path from the departure place to the arrival place.

In one embodiment, a control method of a terminal according to the present invention may comprise the steps of setting an object for tracing a position on the basis of a user input; taking an image for a predetermined space if a motion of a person is sensed from the predetermined space to trace the position of the set object; detecting the position of the set object using the taken image and updating position information of the set object if the position of the set object is changed as a result of detection; and outputting guide information for guiding the position of the set object in at least one of visual, auditory and tactile manners on the basis of the position information if a user request is received.

Also, a system according to the present invention comprises a camera module configured to take an image for a predetermined space if a motion of a person is sensed from the predetermined space; a server for generating position information on one or more objects arranged in the predetermined space by using the taken image and storing the generated position information; and a terminal for requesting the server of position information of an object corresponding to a user request if the user request is received, and outputting guide information in at least one of visual, auditory and tactile manners to guide the position of the object corresponding to the user request if the information is received from the server.

In one embodiment, the camera module may take a first image for the predetermined space if the motion of the person is sensed from the predetermined space and take a second image for the predetermined space if the motion of the person disappears, and the server may generate the position information on the one or more objects by using the first and second images which are taken at their respective timing points.

In one embodiment, the server may detect an object of which position is changed, from the predetermined space by comparing the first and second images with each other, and may generate the position information for only the detected object.

In one embodiment, the server may not generate the position information on the one or more objects if the object of which position is changed is not detected from the predetermined space.

In one embodiment, the one or more objects may be objects preset by a user input, and the server may generate the position information for only the preset object.

In one embodiment, the terminal may include a display unit, and may control the display unit to display a plane view illustrating the predetermined space if the information is received from the server and output a graphic object to a point where the object corresponding to the user request on the plane view is located.

In one embodiment, the graphic object may have a shape varied in accordance with a type of the object corresponding to the user request.

In one embodiment, the terminal may include a display unit, and may control the display unit to display the taken image and highlight one area of a full area of the taken image, in which the object corresponding to the user request is included.

In one embodiment, if the information is received from the server, the terminal may set the point where the terminal is located, to a departure place and set the position of the object corresponding to the user request to an arrival place, and the guide information may be path guide information for guiding a path from the departure place to the arrival place.

Advantageous effects of the terminal and the system comprising the same according to the present invention are as follows.

According to at least one of the embodiments of the present invention, since image or video is taken only if a motion of a person is sensed, degradation of a camera may be delayed, and a memory may be used efficiently.

Also, since position information of an object of which position is changed is managed systematically, a position of an object corresponding to a user request may be found quickly. Therefore, computation of the system is minimized.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

FIGS. 12 and 13 are conceptual views illustrating the method of FIG. 11.

MODES FOR CARRYING OUT THE PREFERRED EMBODIMENTS

Figure 1A:
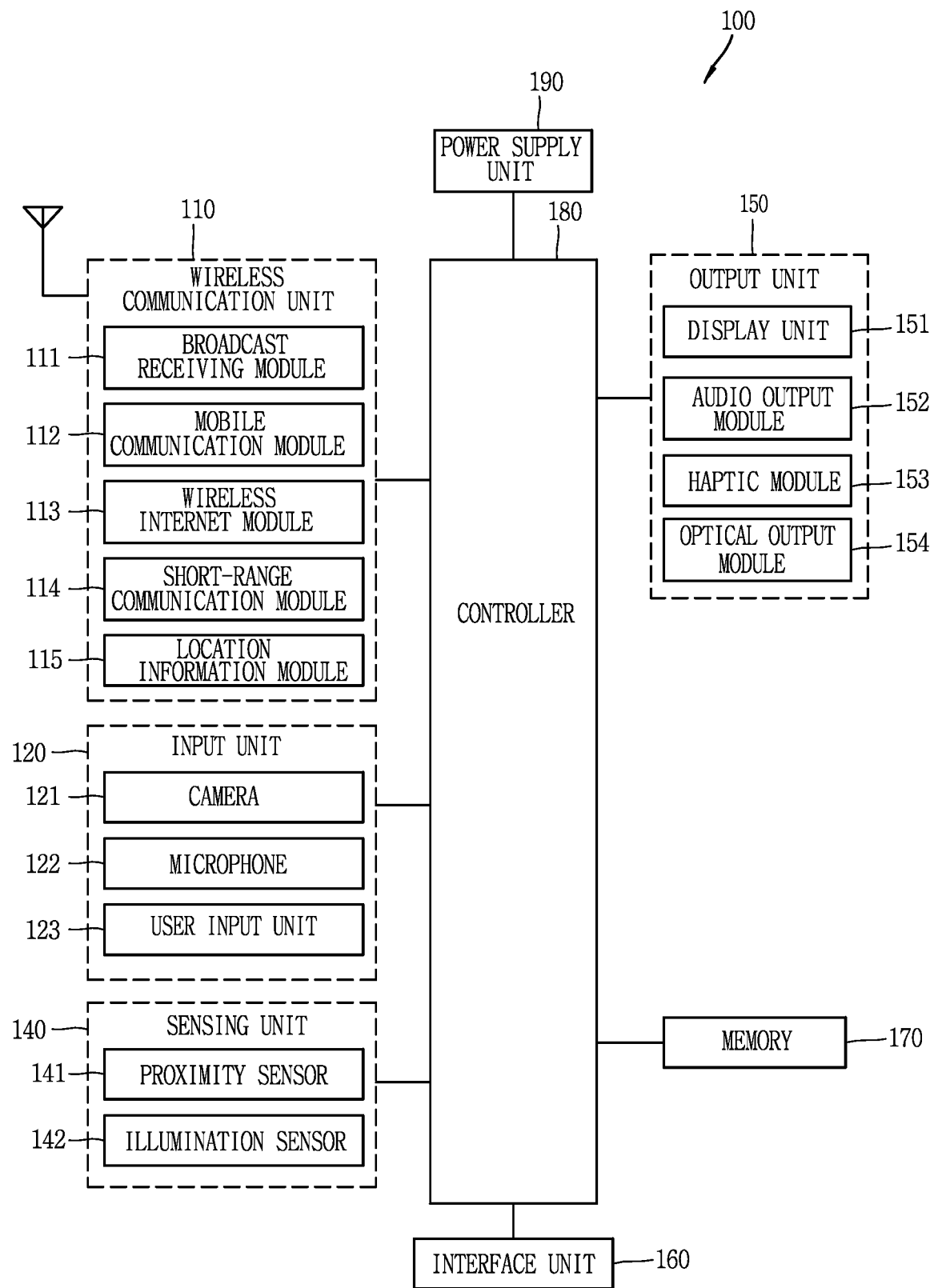
FIG. 1A is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
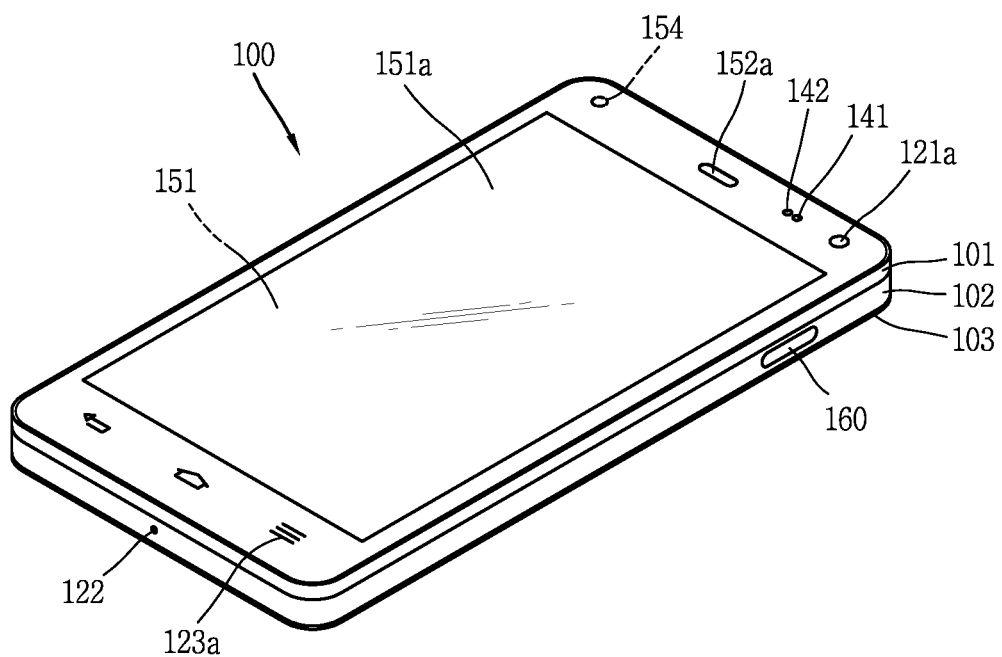
FIGS. 1B and 1C are conceptual views illustrating one example of the mobile terminal, viewed from different directions.
Figure 1C:
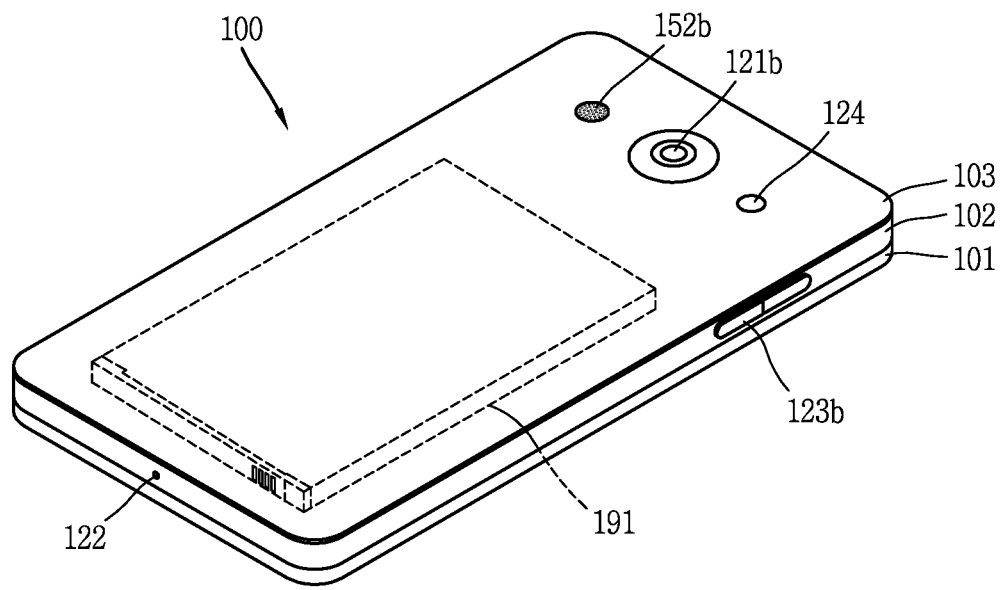

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components shown in FIG. 1A is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from at least two sensors of the sensing unit, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

Further, the controller 180 controls some or all of the components shown in FIG. 1A in order to drive application programs stored in the memory 170. Further, in order to drive the application programs, the controller 180 may operate at least two of the components included in the mobile terminal 100 in a combined manner.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of the mobile terminal according to various embodiments to be explained later. The operation or the control method of the mobile terminal may be implemented on the mobile terminal by driving at least one application program stored in the memory 170.

Hereinafter, the above components will be explained in more detail with reference to FIG. 1A before various embodiments implemented through the aforementioned mobile terminal 100 are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal 100 may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor, a photo sensor, and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to indicate the mobile terminal 100 regarded as at least one integrated body.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first and second audio output modules 152a,152b, the proximity sensor 141, the illumination sensor 142, the optical output unit 154, the first and second cameras 121a, 121b, the first and second manipulation units 123a, 123b, the microphone 122, the interface unit 160, etc.

As shown in FIGS. 1B and 1C, the mobile terminal 100 will be explained under an assumption that the display unit 151, the first audio output module 152a, the proximity sensor 141, the illumination sensor 142, the optical output unit 154, the first camera 121a, and the first manipulation unit 123a are located on a front surface of the terminal body, the second manipulation unit 123b, the microphone 122 and the interface unit 160 are located on a side surface of the terminal body, and the second audio output module 152b and the second camera 121b are located on a rear surface of the terminal body.

However, it is to be understood that alternative arrangements are possible and within the teachings of the instant disclosure. Some components may be omitted or rearranged. For example, the first manipulation unit 123a may not be located on the front surface of the terminal body, and the second audio output module 152b may be located on the side surface of the terminal body rather than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The drawing illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The terminal according to the present invention may be a fixed terminal, which is used in a state that it is installed in a specific position, as well as the mobile terminal described with reference to FIGS. 1a to 1c. The fixed terminal may be referred to as an image display device that includes a device for recording and playing videos and a device for recording and playing audios. The device for recording and playing videos includes a TV, a computer monitor, a projector, etc. as an image display device.

Figure 2:
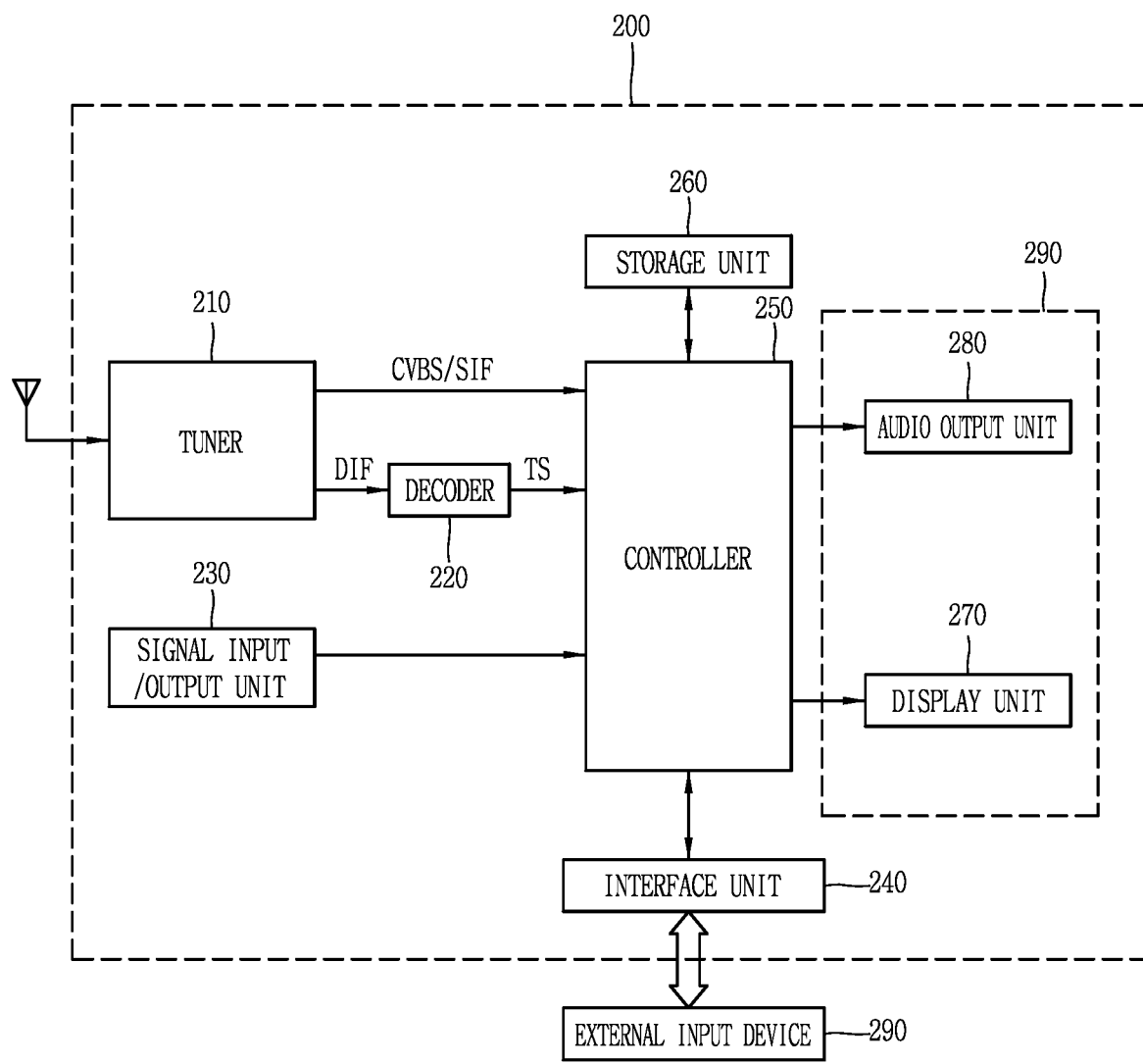
FIG. 2 is a block diagram illustrating an image display device and an external input device according to the present invention.

FIG. 2 is a block diagram illustrating an image display device 200 and an external input device 290 according to the present disclosure. The image display device 200 may include a tuner 210, a decoder 220, a signal input/output unit 230, an interface unit 240, a controller 250, a storage unit 260, a display unit 270, and an audio output unit 280.

Referring to FIG. 2, the tuner 210 may select a radio frequency (RF) broadcast signal, which corresponds to a channel selected by a user, among RE broadcast signals received through an antenna, and convert the selected RF broadcast signal into a medium frequency signal or a baseband image (video)/audio signal. For example, when the RF broadcast signal is a digital broadcast signal, the tuner 210 may convert the RF broadcast signal into a digital IF signal (DIF). On the other hand, when the RF broadcast signal is an analog broadcast signal, the tuner 210 may convert the RF broadcast signal into an analog baseband video/audio signal (CVBS/SIF). The tuner 210 may thus be a hybrid tuner which is capable of processing the digital broadcast signal and the analog broadcast signal.

The digital IF signal (DIF) output from the tuner 210 may be input into the decoder 220, while the analog baseband video/audio signal (CVBS/SIF) output from the tuner 210 may be input into the controller 250. The tuner 210 may receive a signal carrier RF broadcast signal according to an advanced television systems committee (ATSC) standard or a multi-carrier RF broadcast signal according to a digital video broadcasting (DVB) standard.

Although the drawing illustrates one tuner 210, the present disclosure may not be limited to this. The image display device 200 may include a plurality of tuners, for example, first and second tuners. In this case, the first tuner may receive a first RF broadcast signal corresponding to a broadcasting channel selected by a user, and the second tuner may receive a second RF broadcast signal corresponding to a pre-stored broadcasting channel in a sequential or periodical manner. Similar to the first tuner, the second tuber may convert an RF broadcast signal into a digital IF signal (DIF) or an analog baseband video or audio signal (CVBS/SIF).

The decoder 220 may receive the digital IF signal (DIF) converted by the tuner 210 and decode the received signal. For example, when the DIF output from the tuner 210 is a signal according to the ATSC standard, the decoder 220 may perform 8-vestigal side band (8-VSB) demodulation. Here, the decoder 220 may also perform channel decoding, such as trellis decoding, de-interleaving, reed Solomon decoding and the like. To this end, the decoder 220 may include a trellis decoder, de-interleaver, a reed Solomon decoder and the like.

As another example, when the digital IF signal (DIF) output from the tuner 210 is a signal according to the DVB standard, the decoder 120 may perform a coded orthogonal frequency division modulation (COFDMA) demodulation. Here, the decoder 220 may also perform convolution decoding, de-interleaving, reed Solomon decoding and the like. To this end, the decoder 220 may include a convolution decoder, a de-interleaver, a reed Solomon decoder and the like.

The signal input/output unit 230 may perform signal input and output operations by being connected to an external device. To this end, the signal input/output unit 230 may include an A/V input/output unit (not shown) and a wireless communication unit (not shown).

The A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, a liquid HD terminal and the like. Digital signals input through those terminals may be forwarded to the controller 250. Here, analog signals input through the CVBS terminal and the S-video terminal may be forwarded to the controller after being converted into digital signals through an analog-digital converter (not shown).

The wireless communication unit may execute wireless Internet access. For example, the wireless communication unit may execute the wireless Internet access using wireless LAN (WLAN) (Wi-Fi), wireless broadband (Wibro), world interoperability for microwave access (Wimax), high speed downlink packet access (HSDPA) and the like. The wireless communication unit may also perform short-range wireless communication with other electronic devices. For example, the wireless communication unit may perform the short-range wireless communication using Bluetooth, radio frequency identification (RFID), infrared data association (IrDA), ultra wideband (UWB), Zigbee and the like.

The signal input/output unit 230 may transfer to the controller 250 a video signal, an audio signal and a data signal, which are provided from external devices, such as a digital versatile disk (DVD) player, a blu-ray player, a game player, a camcorder, a computer (notebook computer), a portable device, a smart phone and the like. Also, the signal input/output unit 230 may transfer to the controller 250 a video signal, an audio signal and a data signal of various media files, which are stored in an external storage device, such as a memory, a hard disk and the like. In addition, the signal input/output unit 230 may output a video signal, an audio signal and a data signal processed by the controller 250 to other external devices.

The signal input/output unit 230 may perform signal input and output operations by being connected to a set-top box, for example, an Internet protocol TV (IPTV) set-top box via at least one of those various terminals. For instance, the signal input/output unit 230 may transfer to the controller 250 a video signal, an audio signal and a data signal, which has been processed by the IPTV set-top box to enable bidirectional communication, and also transfer signals processed by the controller 250 to the IPTV set-top box. Here, the IPTV may include ADSL-TV, VDSL-TV, FTTH-TV and the like which are divided according to a transmission network.

Digital signals output from the decoder 220 and the signal input/output unit 130 may include a stream signal (TS). The stream signal (TS) may be a signal in which a video signal, an audio signal and a data signal are multiplexed. For example, the stream signal (TS) may be an MPEG-2 transport stream (TS) signal obtained by multiplexing an MPEG-2 video signal and a Dolby AC-3 audio signal. An MPEG-2 TS signal may include a 4-byte header and a 184-byte payload.

The interface 240 may receive an input signal for power control, channel selection, screen setting or the like from an external input device 290 or transmit a signal processed by the controller 250 to the external input device 290. The interface 240 and the external input device 290 may be connected to each other in a wired or wireless manner.

A network interface unit (not shown) provides an interface for connecting the image display device 200 with a wired/wireless network including an internet network. The network interface unit may be provided with an Ethernet terminal, etc. for connection with a wired network. For connection with a wireless network, WLAN (Wireless LAN) (Wi-Fi), Wibro (Wireless broadband), Wimax (World Interoperability for Microwave Access), HSDPA (high speed downlink packet access), etc. may be used.

The network interface unit (not shown) may access to a prescribed web page through a network. That is, the network interface unit may transceive (transmit and receive) data with a corresponding server. The network interface unit may receive content or data provided from a content provider or a network operator. That is, the network interface unit may receive contents such as movies, advertisements, games, VOD, and broadcast signals provided from a content provider or a network provider through a network, and information related thereto. The network interface unit may receive update information and update files provided from a network operator. The network interface unit may transmit data to an Internet provider, a content provider or a network operator.

The network interface unit (not shown) may select and receive a desired application among applications open to the public, through a network.

The controller 250 may control an overall operation of the display device 200. More specifically, the controller 250 may control generation and output of images. For example, the controller 250 may control the tuner 210 to tune an RF broadcast signal corresponding to a user-selected channel or a pre-stored channel. Although not shown, the controller 250 may include a demultiplexer, a video processor, an audio processor, a data processor, an On screen display (OSD) generator and the like. The controller 150 may include a CPU, a peripheral device, etc. by hardware.

The controller 250 may demultiplex a stream signal (TS), e.g., an MPEG-2 TS signal into a video signal, an audio signal and a data signal.

The controller 250 performs image processing, for example, decoding, on an inversely-multiplexed image signal. More specifically, the controller 250 decodes an MPEG-2 standard-encoded image signal by using an MPEG-2 decoder, and decodes an H.264 standard-encoded image signal according to digital multimedia broadcasting (DMB) standard or digital video broadcast-handheld (DVB-H) standards by using an H.264 decoder. In addition, the controller 250 may perform the imaging processing in such a manner that brightness, tint and color of the image signal are adjusted. The image signal, which is image-processed by the controller 250, may be transferred to the display unit 270 or transferred to an external output device (not shown) through an external output port.

The controller 250 may perform, voice processing, for example, decoding, on an inversely multiplexed voice signal. More specifically, the controller 250 decodes an MPEG-2 standard-encoded voice signal by using an MPEG-2 decoder, decodes an MPEG 4 bit sliced arithmetic coding (BSAC) standard-encoded voice signal according to the DMB standards by using an MPEG 4 decoder, and decodes an MPEG 2 advanced audio coded (AAC) standard-encoded voice signal according to satellite DMB standards or the digital video broadcast-handheld (DVB-H) standards by using an AAC decoder. In addition, the controller 250 may perform base processing, treble processing, and sound volume processing. The voice signal that is processed by the controller 250 in this manner may be transferred to the audio output unit 280, e.g., a speaker, or may be transferred to an external out device.

The controller 250 may process an analog baseband video/audio signal (CVBS/SIF). Here, the analog baseband video/audio signal (CVBS/SIF) input to the controller 250 may be an analog baseband video/audio signal output from the tuner 210 or the signal input/output unit 230. The processed video signal is displayed on the display unit 270, and the processed audio signal is output through the audio output unit 280.

The controller 250 may process, for example, decode a demultiplexed data signal. Here, the data signal may include electronic program guide (EPG) information, which may include broadcast information, such as start time, end time and the like, related to a broadcast program broadcasted on each channel. The EPG information may include ATSC-program and system information protocol (ATSC-PSIP) information and DVB-service information (DVB-SI) information. The ATSC-PSIP information or DVB-SI information may be included in an MPEG-4 TS header (4 bytes).

The controller 250 may perform on-screen display (OSD) processing. In more detail, the controller 250 may generate an OSD signal for displaying various information as graphic or text data based on at least one of a video signal and a data signal or an input signal received from the external input device 290. The OSD signal may include various data such as a user-interface (UI) screen for the image display device 200 and various menu screens, widgets, icons and the like.

The storage unit 260 may store various programs for signal processing and control by the controller 250, and may also store processed video, audio and data signals. The storage unit 260 may include at least one of a flash memory-type storage medium, a hard disc-type storage medium, a multimedia card micro-type storage medium, a card-type memory (for example, SD or XD memory), a random access memory (RAM), a static random access memory (SRAM), a read-only memory (ROM), an electrically erasable programmable ROM (EEPROM), a programmable read-only memory (PROM), a magnetic memory, a magnetic disk and an optical disk.

The display unit 270 may convert a processed video signal, a processed data signal, and an OSD signal provided by the controller 250 into RGB signals, thereby generating driving signals. Under such configuration, the display unit 270 outputs images. The display unit 270 may be implemented into various types of displays such as a plasma display panel, a liquid crystal display (LCD), a thin film transistor-LCD (TFT-LCD), an organic light-emitting diode (OLED), a flexible display, a three-dimensional (3D) display, an e-ink display and the like. The display unit 270 may also be implemented as a touch screen and may thus be used as an input device.

The audio output unit 280 is configured to output a voice signal processed by the controller 250, e.g., a stereo signal or a 5.1-channel signal. The audio output unit 280 may be implemented as various types of speakers.

A capturing unit (not shown) for capturing a user may be further provided. The capturing unit (not shown) may be implemented as a single camera. However, the capturing unit may be implemented as a plurality of cameras. Information on images captured by the capturing unit (not shown) is input to the controller 250.

For sensing of a user's gesture, a sensing unit (not shown), having at least one of a touch sensor, a sound sensor, a position sensor and an operation sensor, may be further provided at the image display device 200. A signal sensed by the sensing unit (not shown) may be transferred to the controller 250 through the interface unit 240.

The controller 250 may sense a user's gesture based on images captured by the capturing unit (not shown), or based on signals sensed by the sensing unit (not shown), or by combination of them.

A power supply unit (not illustrated) supplies electric power to the image display device 200. Specifically, the power supply unit supplies electric power the controller 250 that is realized in the form of a system-on chip (SOC), the display unit 270 for displaying an image, and the audio output unit 280 for outputting audio.

To do this, the power supply unit (not illustrated) may include a converter (not illustrated) that converts DC power into AC power. For example, if the display unit 270 is realized as a liquid crystal panel including multiple backlight lamps, the power supply unit may further include an inverter (not illustrated) in which a PWM operation is possible for brightness variability and dimming drive.

The external input device 290 is connected to the interface unit 240 by a cable or wirelessly, and transmits an input signal that is generated according to a user input, to the interface unit 240. The external input device 290 may include a remote controller, a mouse, a keyboard, and the like. The remote controller transmits an input signal to the interface unit 240 by using Bluetooth communication, RF communication, IR communication, ultra wideband (UWB) communication, ZigBee communication, or the like. The remote controller may be implemented as a spatial remote controller. The spatial remote controller may generate an input signal by detecting a movement of a main body.

The image display device 200 may be realized as a fixed type digital broadcast receiver for receiving at least one of an ATSC type (8-VSB type) digital broadcast, a digital broadcast, a DVB-T type (COFDM type) digital broadcast, and an ISDB-T type (BST-OFDM type) digital broadcast. Alternatively, the image display device 200 may be realized as a mobile type digital broadcast receiver for receiving at least one of a ground wave DMB type digital broadcast, a satellite DMB type digital broadcast, an ATSC-M/H type digital broadcast, a DVB-H type (COFEM type) digital broadcast, and a media forward link-only type digital broadcast. Alternatively, the image display device 200 may be implemented as a digital broadcast receiver for cable communication, satellite communication or IPTV.

Although not shown, the image display device 200 may comprise a camera 221 for inputting an image signal. The controller 250 takes an image by using the camera 221 if a preset condition is satisfied, and stores the taken image in a memory (not shown). The image stored in the memory is then used to trace a position of an object requested by a user.

The external input device 290 may transmit and receive a signal to/from the image display device 200 according to an RF communication standard. A control menu may be displayed on a screen of the image display device 200 according to a control signal of the external input device 290. The external input device 290 may be provided with a plurality of buttons, and may generate an external input signal according to a user's operation to manipulate buttons.

The present invention provides a terminal that performs an assistance function for assisting a memory of a person in a home or company, and a system comprising the same. A user uses various objects arranged in a predetermined space whenever needed but may look for an object after putting the object in a random position. If the user does not remember the position, inconvenience occurs in that the user should check the predetermined space in detail to look for the object. Since the terminal according to the present invention may guide a position of an object corresponding to a user request if the user request is received, the aforementioned inconvenience may be solved simply.

The terminal according to the present invention comprises the mobile terminal 100 described with reference to FIGS. 1a to 1c and the image display device 200 described with reference to FIG. 2.

Figure 3A:
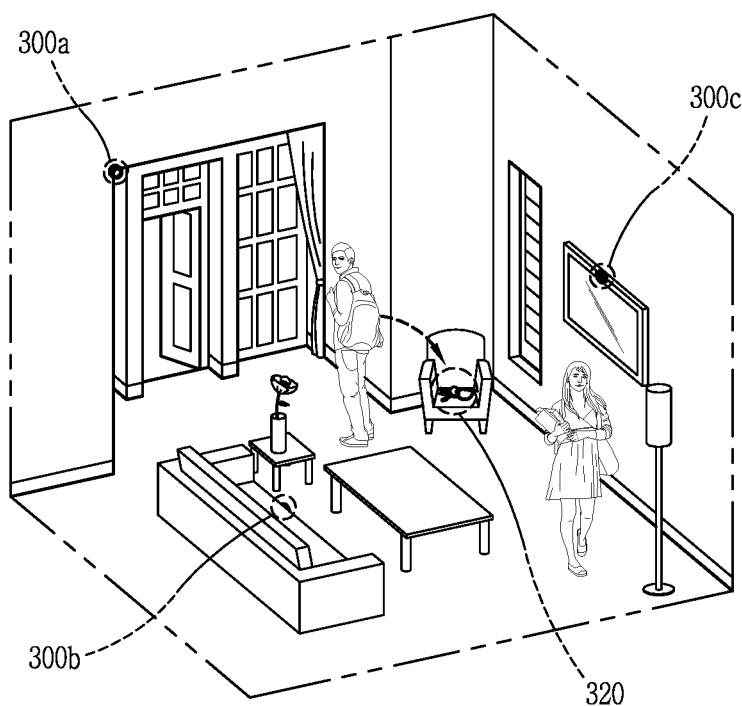
FIGS. 3A and 3B are exemplary views illustrating one example of an operation of a system according to the present invention.
Figure 3B:
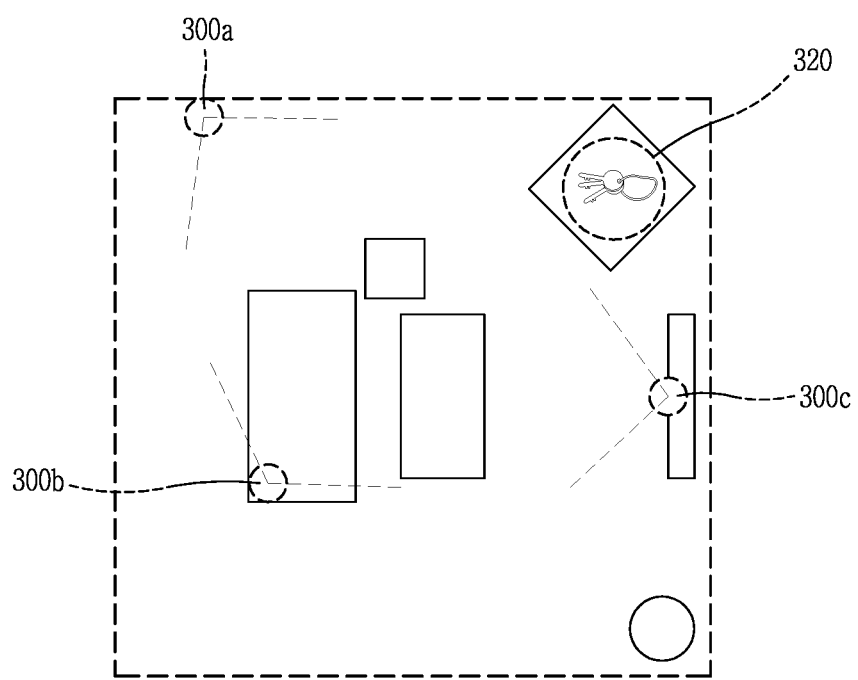
Figure 3C:
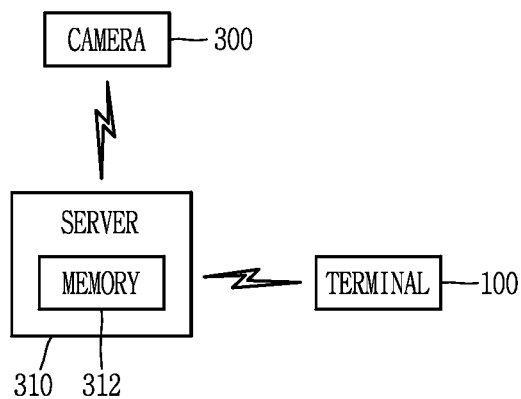
FIG. 3C is a block diagram illustrating a system according to the present invention.

FIGS. 3A and 3B are exemplary views illustrating one example of an operation of a system according to the present invention, and FIG. 3C is a block diagram illustrating a system according to the present invention.

In accordance with the development of a smart home technique that connects and controls all of devices including home appliances in a home and the construction of an internet of things environment, a plurality of devices arranged in a predetermined space may be connected with one another by a wire or wireless network to share information.

The predetermined space may be modified in various manners in accordance with the embodiment, and at least one of a position and a size of the space may be changed by a user.

In the present invention, a case that the predetermined space is a living room will be described as an example for convenience of description, however, the predetermined space is not limited to the living room. For example, a house comprised of a plurality of rooms may be set to the predetermined space, or the predetermined may be set to an office. In this way, the predetermined space may be comprised in various forms.

Various devices may be arranged in the predetermined space. A camera such as CCTV may be included in the devices, and a device provided with a camera, such as a smart TV, may be included in the devices. The camera or the device provided with a camera performs photographing if a predetermined condition is fulfilled. For example, the smart TV provided with a camera may take a photo or an image by using the camera if the predetermined condition is fulfilled.

In accordance with increase of camera penetration in homes, it is possible to take an image for a predetermined space by using a smart device having a camera module which is not used.

Although the smart device may always take the predetermined space, the smart device performs photographing only if as a motion of a person is sensed using a sensor that may sense the motion of the person.

The predetermined condition means that motion of the person is sensed in the predetermined space. Examples of the motion of the person may include a case that a person enters a predetermined space, a case that a person who was sleeping wakes up, and a case that a person who was sitting down stands up.

A human body sensor may be provided in the predetermined space to sense such a motion of the person. The human body sensor may generate a photographing command and transmit the generated photographing command to devices comprising a camera if the predetermined condition is fulfilled.

The device comprising a camera may continue to take a video while the predetermined condition is being fulfilled. That is, the device may start to take a video when the predetermined condition is fulfilled, and may end photographing of a video when the state that the predetermined condition is fulfilled is switched to a state that the predetermined condition is not fulfilled.

Unlike this case, the device comprising a camera may take a first image when the predetermined condition is fulfilled, and may take a second image when the state that the predetermined condition is fulfilled is switched to a state that the predetermined condition is not fulfilled.

The terminal or the system detects an object of which position is changed in the predetermined space by using the image or video taken by the camera. For example, if the first and second images are taken, the terminal or the system detects the object of which position is changed by comparing the first and second images with each other.

In this case, the object of which position is changed means any one of an object which newly appears in a predetermined space, an object which disappears from the predetermined space, and an object of which position is changed from one point of the predetermined space to another point.

For example, referring to FIGS. 3A and 3B, a camera arranged in a predetermined space and devices 300a to 300c comprising a camera take an image if a predetermined condition is fulfilled. The terminal or the system may detect that a new object 320 (for example, key) appears in the predetermined space, through the taken image.

If there is an object of which position is changed, the terminal or the system records information of the corresponding object in a storage medium. THE information of the object may include a current position of the object, a shape of the object, a size of the object, a color of the object, the time when a position is changed, an image taken at the time when the position is changed, and the like.

If there is no object of which position is changed, the first and second images are deleted. This is to efficiently use a storage space of the memory.

Meanwhile, position information of the object of which position is changed is stored in a database and then managed. If a position guide request of a specific object is received from a user, the terminal or the system may search for information matched with the specific object from the database and guide the position of the specific object to the user on the basis of the searched information.

For example, if the user desires to search for a remote controller, the user may tell "find remote controller". In this case, the terminal located in a predetermined space may search for a position of the remote controller on the basis of a user request and guide the position of the remote controller in at least one of visual, auditory and tactile manners on the basis of the searched information.

To perform such a function, the system according to the present invention includes a terminal 100, a camera 300, a server 310 and a memory 312 as shown in FIG. 3C. The server 310 detects an object of which position is changed, by using the image taken from the camera 300, and stores the detected result in the memory 312. The position information may be stored for one day, one week or one month in accordance with a setup of the user. The position information of which storage period has passed is deleted for efficient use of the memory.

The terminal 100 receives a search word associated with a specific object from the user, and requests the server 310 of the position information of the object corresponding to the search word by transmitting the search word to the server 310. The server 310 searches for an object corresponding to the search word from the information stored in the memory 312, and provides the searched information to the terminal 100. The terminal 100 guides the position of the object on the basis of the information provided from the server.

Figure 4:
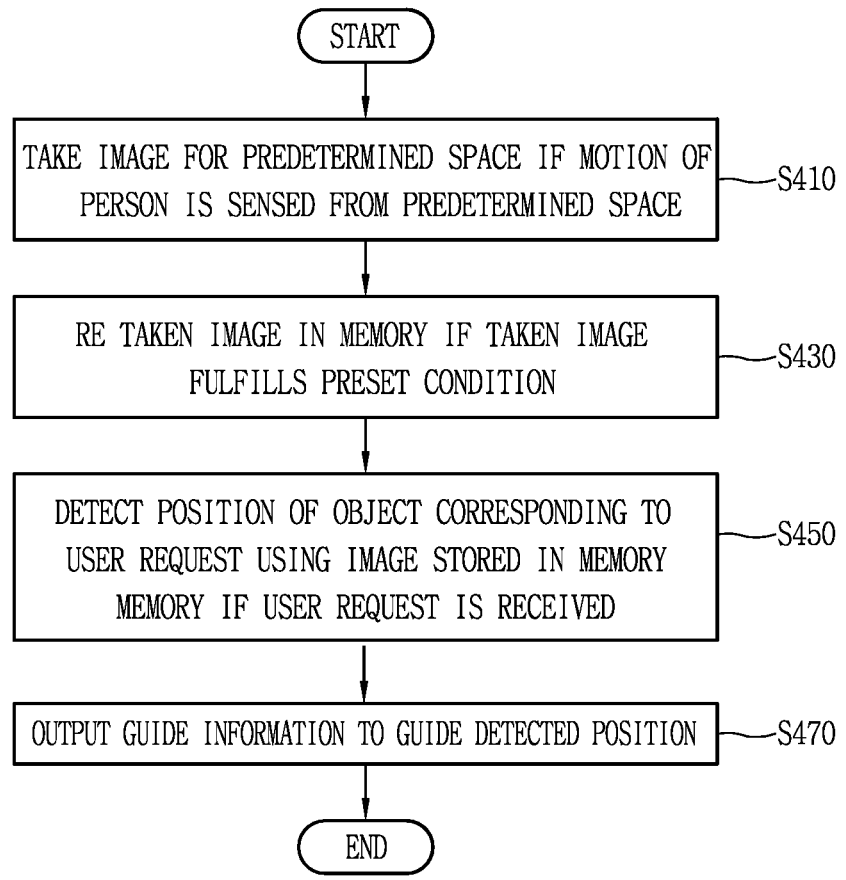
FIG. 4 is a flow chart illustrating a control method of a system according to the present invention.

FIG. 4 is a flow chart illustrating a control method of a system according to the present invention.

First of all, if a motion of a person is sensed from a predetermined space, the system takes an image for the predetermined space (S410).

In more detail, the human body sensor senses the motion of the person in the predetermined space, and determines whether the sensed motion fulfills a predetermined condition. If the predetermined condition is fulfilled, the system broadcasts a photographing command such that a video or an image is taken. Devices that have received the broadcasted photographing command take an image by using the camera provided therein.

Next, if the taken image fulfills a preset condition, the system stores the taken image in the memory (S430).

If photographing is completed, the taken image or video is received to the server. The server detects an object of which position is changed, on the basis of the received image. As a result of detection, if there is an object of which position is changed, the system stores the received image in the memory, and newly generates position information of the object of which position is changed or updates the position information previously stored in the memory. If there is no object of which position is changed, the system deletes the received image.

Figure 5A:
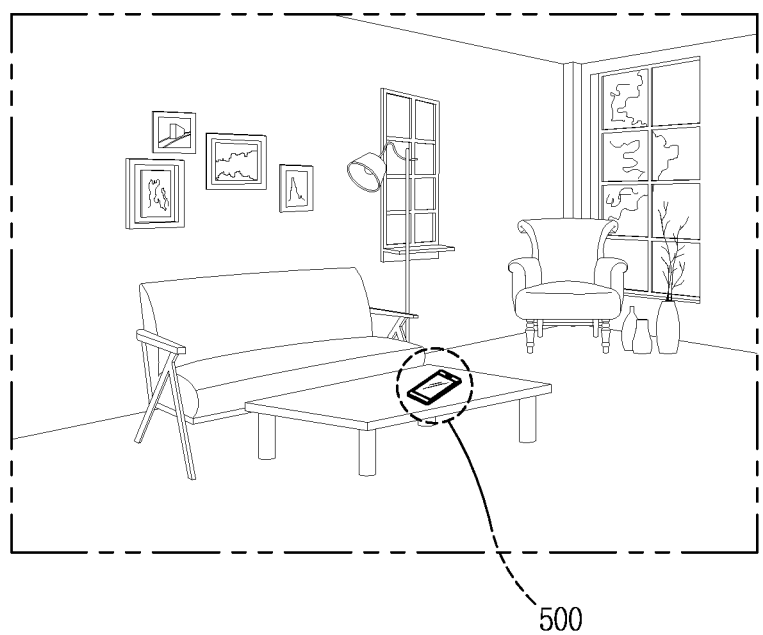
FIGS. 5A and 5B are conceptual views illustrating a method for taking an image for a predetermined space in accordance with the control method of FIG. 4.
Figure 5B:
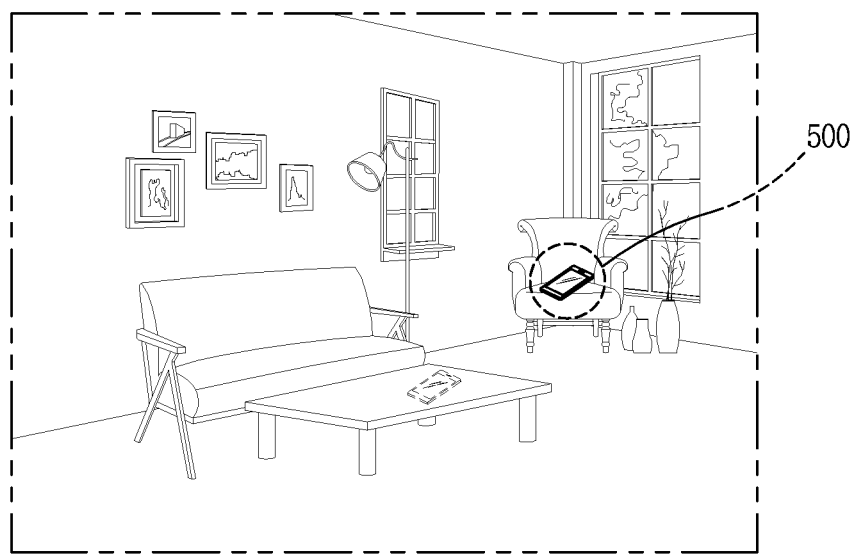

For example, as shown in FIGS. 5A and 5B, the system may detect an object 500 of which position is changed, from the taken image. The server may extract an image for the detected object 500 and search for a title of the corresponding object by using the extracted image through an internet network. The server stores information searched through the internet network, the taken image and position information indicating the position of the object in the memory.

It is noted that at least one object has moved a first image taken when the motion of the person is sensed and a second image taken when the motion of the person ends. The system detects a change of image taken by the camera and stores the position information of which position is change in the database. A name, color, size, time, position, etc. of the object may together be stored in the database.

Next, if a user request is received, the system detects a position of an object corresponding to the user request by using the image stored in the memory (S450).

The user may input a search word of an object, which is desired to find, by using the terminal. For example, the user may input the search word through a voice command. For another example, the terminal may output a virtual keypad to the display unit to allow the user to type the search word.

The terminal may request the server of the position information of the object corresponding to the search word by transmitting the input search word to the server. The server searches for the position information of the object corresponding to the user request in response to the request transmitted from the terminal. If there is the position information which is searched, the server transmits the corresponding information to the terminal, and if there is no position information which is searched, the server notifies that there is no information which is searched.

The search word may be a name of the object, or may be a sentence stating size/color/shape/type of the object.

The terminal may output guide information on the basis of the information received from the server to guide the detected position, or may guide that the corresponding object has not been detected (S470).

If the camera continues to take an image, an enough storage space for storing the corresponding image should be provided. In this case, a problem occurs in that high cost is required for the system. Also, since the system should search for the object of which position is changed, by using all of images which are taken, a problem occurs in that the amount of computation is increased. In the system according to the present invention, since an image or video is taken only if the motion of the person is sensed, the aforementioned problem is solved.

Also, since the position information of which position is changed is managed systematically, the position of the object corresponding to the user request may be found quickly. Therefore, the amount of computation in the system is minimized.

Figure 6:
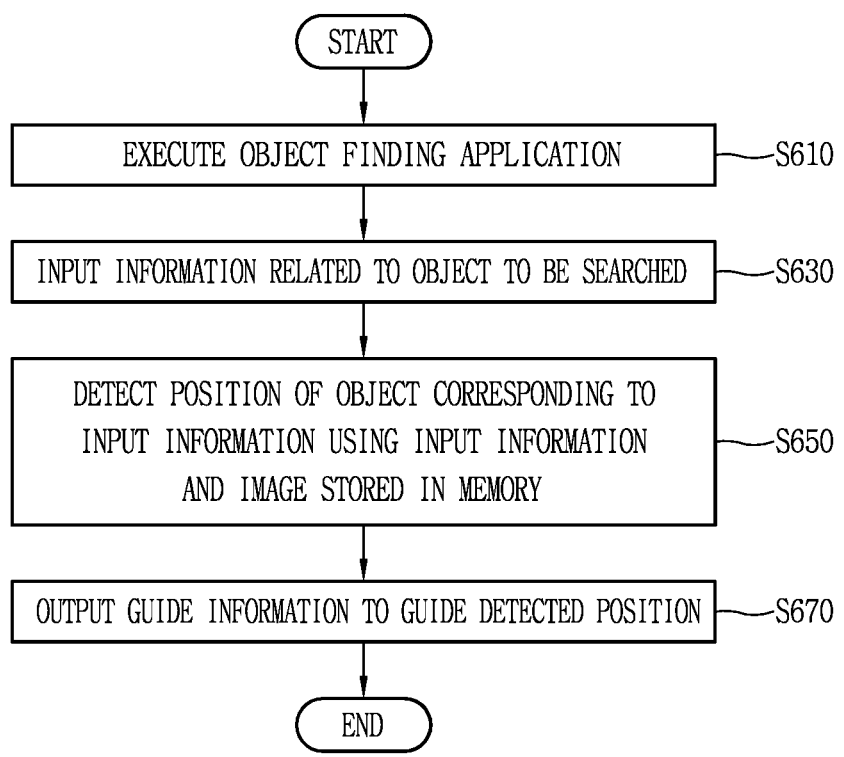
FIG. 6 is a flow chart illustrating a control method of a terminal that provides an object finding function.

FIG. 6 is a flow chart illustrating a control method of a terminal that provides an object finding function.

The terminal may output position information of an object corresponding to a user request in response to the user request.

First of all, the terminal executes an object finding application (S610). The user may execute the object finding application installed in the terminal by using a touch or a voice command.

Next, information related to an object to be searched is input by the use (S630). A search word corresponding to a name of the object or various kinds of information related to the object may be input from the user.

Figure 7A:
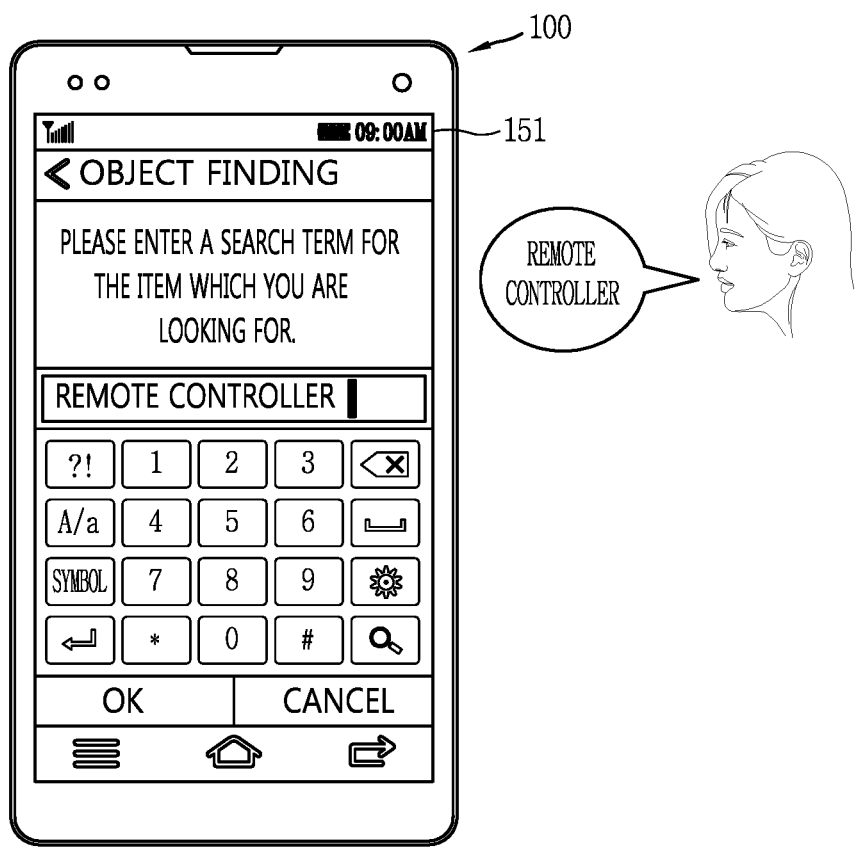
FIGS. 7A and 7B are conceptual views illustrating a method for inputting information related to an object desired by a user to find.

For example, as shown in FIG. 7A, a search word may be input by a touch input applied to a virtual keypad, or a search word such as "remote controller" may be input through voice recognition.

Figure 7B:
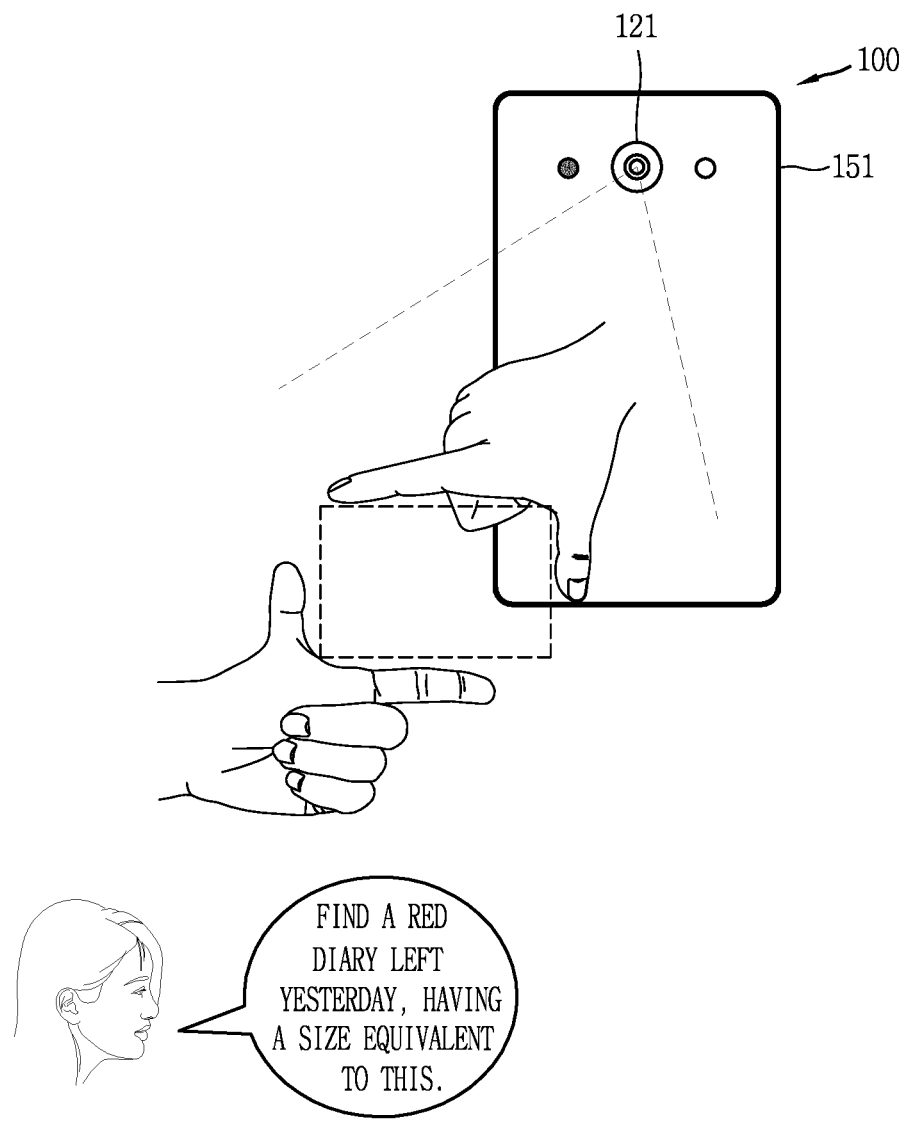

Moreover, a sentence describing an object such as color size and shape of the object may be input or a voice command based on a natural language may be input. For example, as shown in FIG. 7B, the user may input a voice command such as "find a red diary left yesterday, having a size equivalent to this" in a state that the object finding application is executed. At this time, the terminal take a gesture of a user by activating a camera provided therein and calculate a size of an object desired to be found by the user on the basis of the taken gesture.

The terminal detects a position of the object corresponding to the input information by using the input information and the image stored in the memory (S650). The terminal requests the server of position information of the object corresponding to "red diary", and the server searches for an object matched with the position information. The server searches for "red diary" by using the image taken yesterday, wherein the red diary has a size requested by the user.

If the object corresponding to the user request is detected, the terminal outputs guide information to guide the detected position (S670).

The terminal may output the guide information for guiding the position of the object in various manners.

Figure 8A:
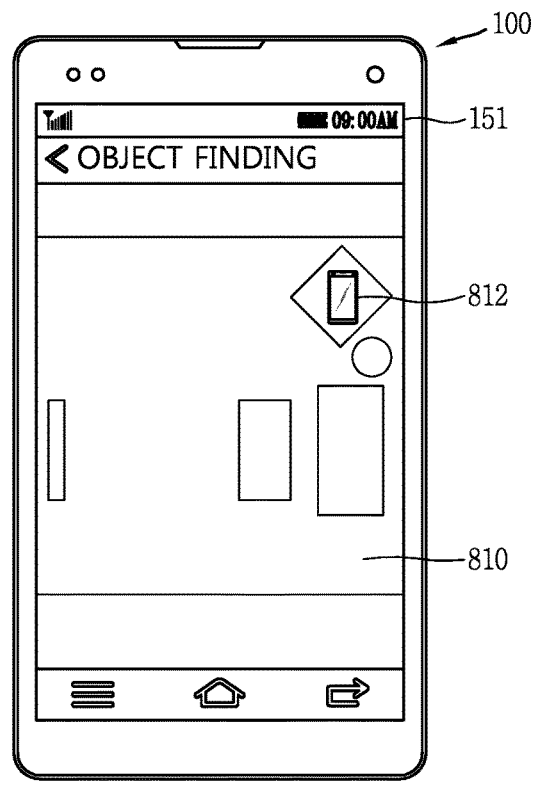
FIGS. 8A to 8D are conceptual views illustrating a terminal for guiding a position of an object corresponding to a user request.

For example, as shown in FIG. 8A, the terminal controls the display unit to display a plane view 810 illustrating a predetermined space, and outputs a graphic object 812 at a point where the object corresponding to the user request. A shape of the graphic object is varied depending on the type of the object corresponding to the user request. For example, an image indicating a cellular phone may be output in case of the cellular phone, and an image indicating a key may be output in case of the key.

Figure 8B:
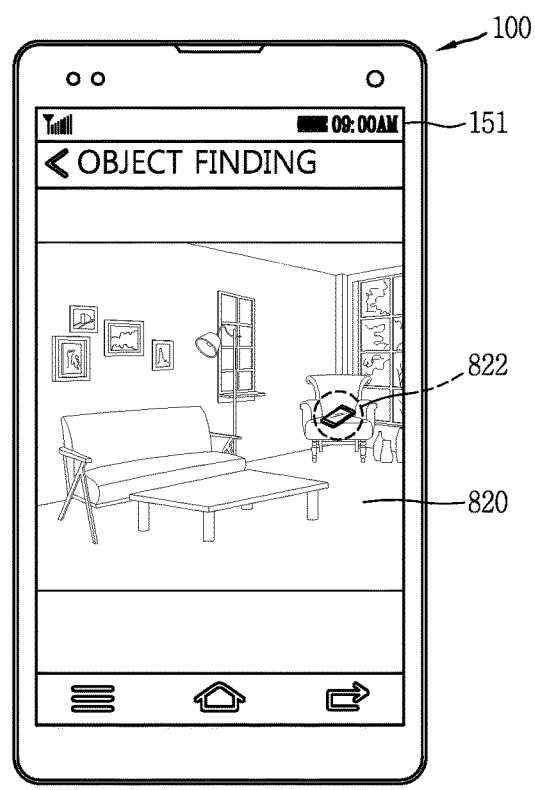
Figure 8C:
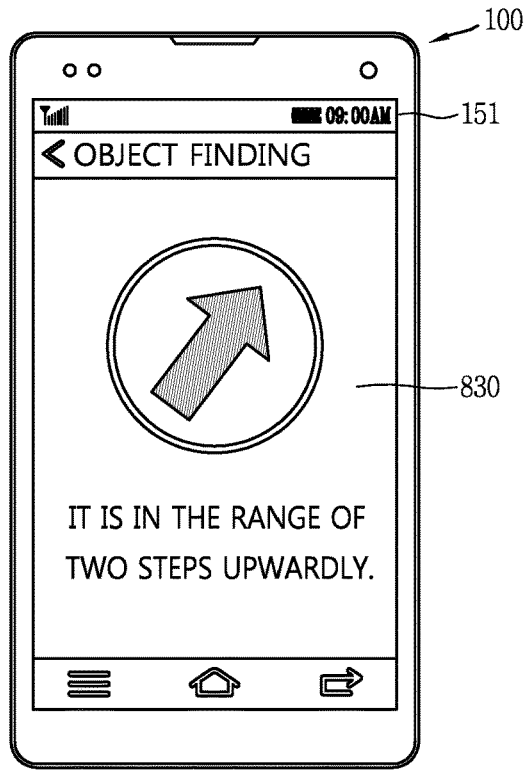

For another example, as shown in FIG. 8B, the terminal may control the display unit to output the image 820 output by the camera. One area of a full area of the taken image, in which the object corresponding to the user request is included, may be highlighted (822) to guide the position of the object. Also, as shown in FIG. 8C, time information on the time when the image is taken may be guided together with the taken image. As a result, the terminal may perform an assistant role for assisting the user's memory.

Figure 8D:
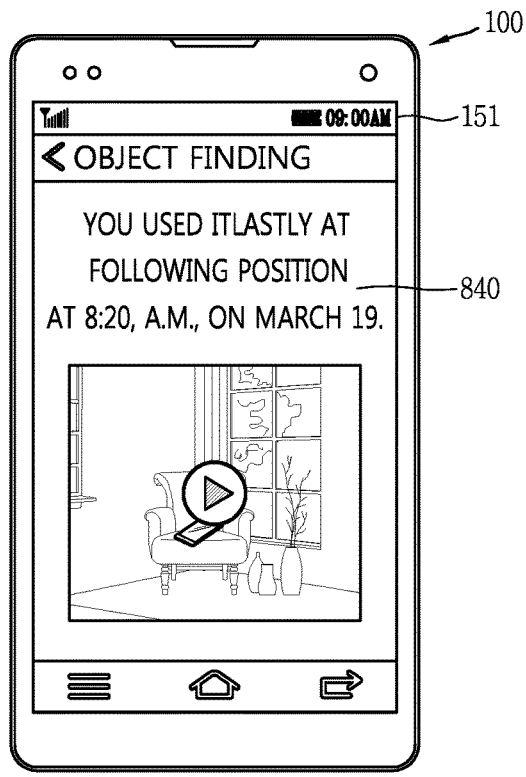

For other example, as shown in FIG. 8D, the terminal may set the point where the terminal is located, to a departure place, set the position of the object corresponding to the user request to an arrival place, and guide a path 830 from the departure place to the arrival place. As a result, the user may be guided an exact position of the object desired to be searched.

Figure 9:
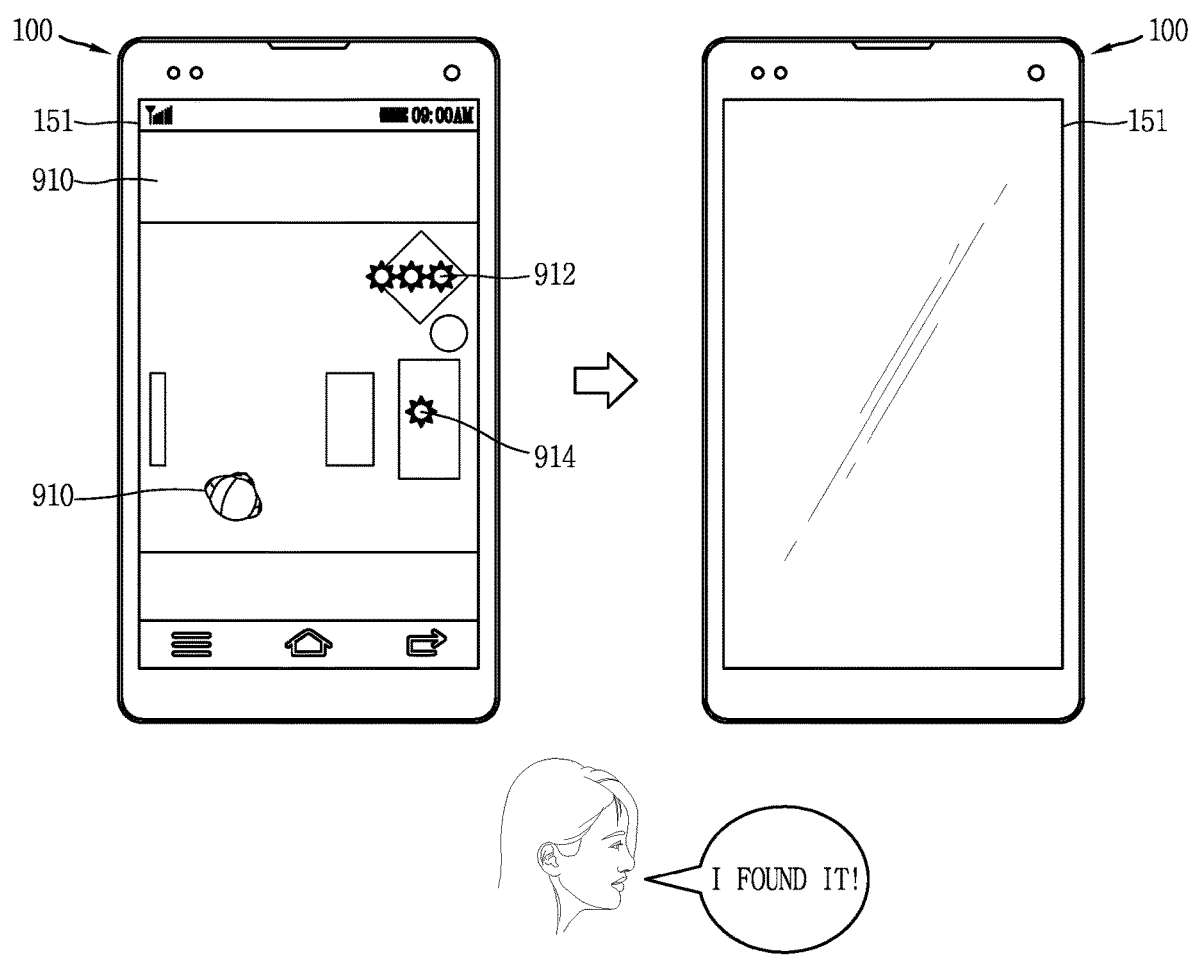
FIG. 9 is a conceptual view illustrating a method for guiding positions of a plurality of objects searched when the objects are searched.

A plurality of objects corresponding to the user request may be detected. FIG. 9 is a conceptual view illustrating a method for guiding positions of a plurality of objects searched when the objects are searched.

The terminal may recommend a plurality of possible candidate places.

To this end, the server detects at least one object corresponding to the user request among the objects stored in the database. In more detail, the server scores a matching level between the object stored in the data base with the object corresponding to the user request, and extracts the object higher than a reference score. The server transmits position information of the extracted object to the terminal together with the matching score.

If information is received from the server, as shown in FIG. 9, the terminal outputs a plane view 910 for a predetermined space. The terminal displays graphic objects 912 and 914 on candidate places where the object may exist, on the basis of the received information. The terminal may vary sizes and colors of the graphic objects on the basis of the matching score.

A graphic object 915 for guiding the point where the terminal is located may further be output from the plane view 910.

Meanwhile, if a voice command indicating that the object has been found is received from the user, the terminal ends the output of the guide information and turns off the display unit. This is to efficiently use a battery.

Figure 10:
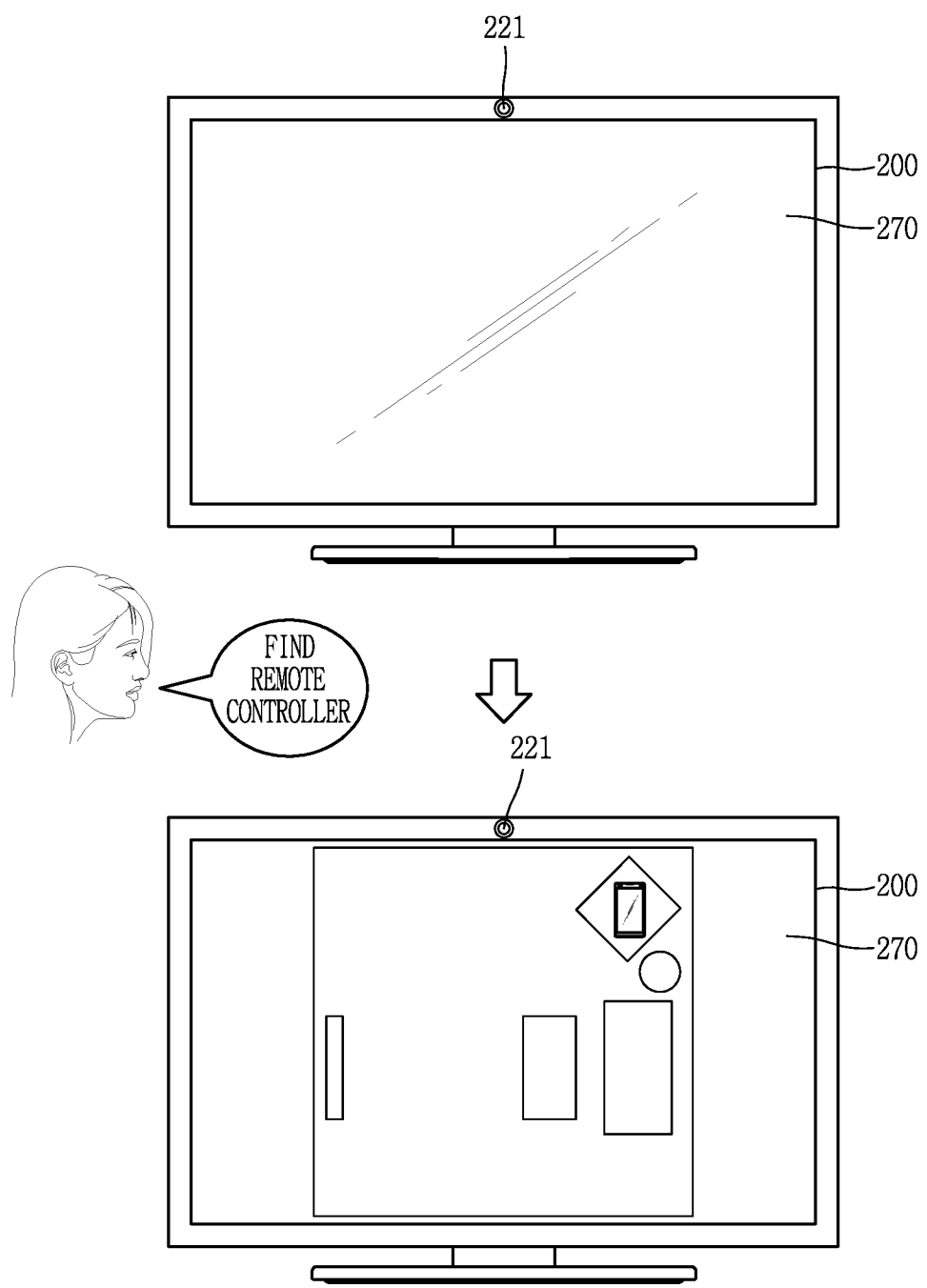
FIG. 10 is a conceptual view illustrating the control method of FIG. 4 performed by a terminal not a system.

FIG. 10 is a conceptual view illustrating the control method of FIG. 4 performed by a terminal not a system. The system described through FIGS. 3 to 9 may be configured by one terminal. That is, the step of setting an object for tracing a position on the basis of a user input in the terminal not the system, the step of taking an image for a predetermined space if a motion of a person is sensed from the predetermined space to trace the position of the set object, the step of detecting the position of the set object using the taken image and updating position information of the set object if the position of the set object is changed as a result of detection, and the step of outputting guide information for guiding the position of the set object in at least one of visual, auditory and tactile manners on the basis of the position information if a user request is received may be performed.

To this end, the terminal may include a camera module 221 configured to take an image for a predetermined space if a motion of a person is sensed from the predetermined space, a memory for storing the image taken from the camera module, and a controller for detecting a position of an object corresponding to a user request by using the image stored in the memory if the user request is received, and outputting guide information for guiding the detected position in at least one of visual, auditory and tactile manners. The guide information may be output visually by the display unit 270.

Figure 11:
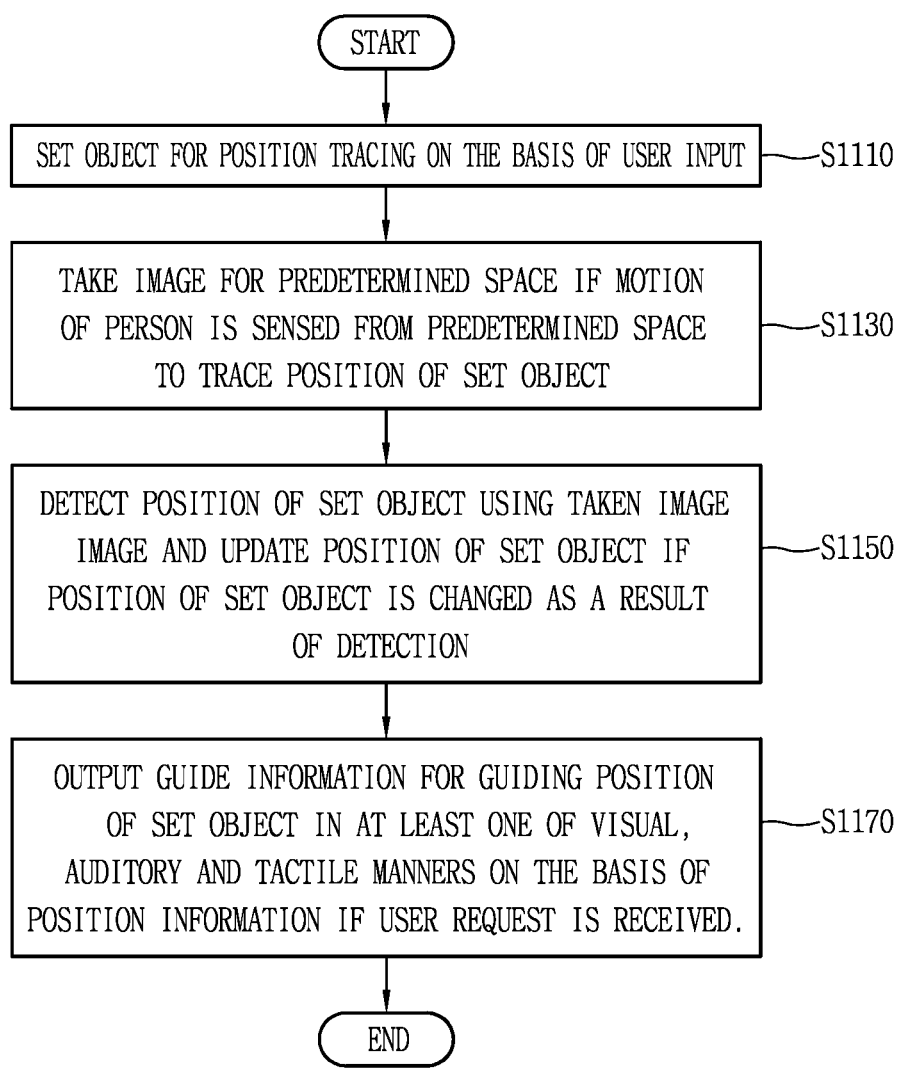
FIG. 11 is a flow chart illustrating a method for tracing an object preset by a user.

FIG. 11 is a flow chart illustrating a method for tracing an object preset by a user.

According to one embodiment of the present invention, the terminal or the system may trace the position of the object set by the user. That is, the terminal or the system traces a position of only a preset object not a random object.

First of all, the terminal or the system sets an object of which position is to be searched, on the basis of a user input (S1110). As shown in FIG. 12, the user may take an image of an object to be set, by using the camera provided in the terminal. To increase exactness of position tracing, the terminal may output guide information for guiding an object to be taken in various angles.

If the object is completely taken, the terminal may extract color, size and shape features of the object by using the taken image and output the extracted result to the display unit as object information. The user may edit the object information.

Next, if a motion of a person is sensed from a predetermined space, the terminal takes an image for the predetermined space to trace the position of the set object (S1130). The terminal detects the position of the set object by using the taken image, and updates position information of the set object if the position of the set object is changed as a result of the detection (S1150).

If the user request is received, the terminal outputs the guide information for guiding the position of the set object in at least one of visual, auditory and tactile manners on the basis of the position information (S1170).

Figure 13:
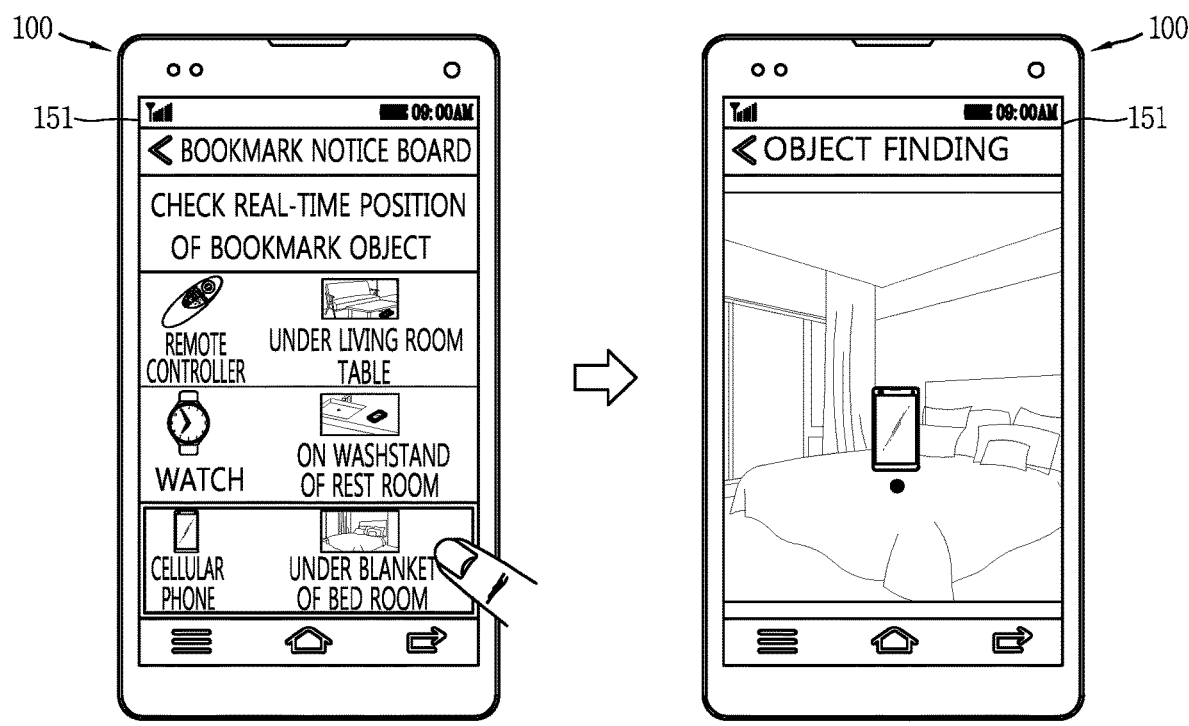

For example, as shown in FIG. 13, if the object finding application is executed, the corresponding execution screen may be output to the display unit 151. The execution screen includes the guide information for guiding the position of the preset object. For example, if a remote controller, a watch, and a cellular phone are preset, their respective position information for guiding each position may be output in the form of list. As a result, the user may register an object frequently lost, and may be guided position information of the corresponding object from the terminal.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal.

Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The embodiments of the present invention provide a terminal having a display unit for outputting video information, and a system having the same. The present invention provides a method for efficiently searching an object having its position changed, and may be applicable to various industrial fields related thereto.

The invention claimed is:

1. A terminal comprising:
a display unit;
a camera module configured to capture an image of a predetermined space when a motion of a person is sensed in the predetermined space;
a memory configured to store the image taken from the camera module; and
a controller configured to:
in response to receiving a user request for determining a position of an object, detect the position of the object using the image stored in the memory, and
output guide information for guiding the user to the position of the object in at least one of visual, auditory and tactile manners,
wherein the user request is performed by the user applying a touch input to a virtual keyboard displayed on the display unit or by a natural language voice input by the user, and
wherein the guide information includes:
a plane view of the predetermined space with a graphic object at a point corresponding to the determined position of the object, wherein the graphic object is an image corresponding to the object, or
an image of the predetermined space captured by the camera module and highlighting the object in the displayed image.

2. The terminal according to claim 1, wherein the controller controls the memory to store the captured image only if the image fulfills a preset condition.

3. The terminal according to claim 2, wherein the camera module captures a first image of the predetermined space only if the motion of the person is sensed in the predetermined space and captures a second image of the predetermined space only if the motion of the person disappears, and the controller stores the first and second images in the memory if the first and second images fulfills the preset condition.

4. The terminal according to claim 3, wherein the controller detects the object of which position is changed, in the predetermined space by comparing the first and second images with each other, and stores the first and second images in the memory in accordance with the detected result.

5. The terminal according to claim 1, wherein in response to receiving the user request, the controller sets the point where the terminal is located, to a departure place and sets the position of the object corresponding to the user request to an arrival place, and the guide information is path guide information for guiding a path from the departure place to the arrival place.

6. The terminal according to claim 1, wherein the user request is performed by the natural language voice input by the user together with a gesture corresponding to at least one of a size and shape of the object,
wherein the gesture is captured by the camera module, and
wherein the controller is configured to calculate a size or shape of the object based on the gesture.

7. The terminal according to claim 1, wherein the determining the position of the object includes determining a plurality of possible candidate positions of the object, and
wherein the guide information includes displaying the plurality of possible candidate positions of the object in the form of separate graphic objects in the plane view of the predetermined space.

8. A control method of a terminal including a display unit and a camera module, the method comprising:
setting an object for tracing a position based on of a user input;
capturing an image, using the camera module, of a predetermined space when a motion of a person is sensed from the predetermined space;
in response to receiving a user request from a user for determining a position of the object, detecting the position of the object using the image;
updating position information of the object when the position of the object is changed; and
outputting guide information on the display unit for guiding the user to the position of the object in at least one of visual, auditory and tactile manners,
wherein the user request is performed by the user applying a touch input to a virtual keyboard displayed on the display unit or by a natural language voice input by the user to the terminal, and
wherein the guide information includes:
a plane view of the predetermined space with a graphic object at a point corresponding to the determined position of the object, wherein the graphic object is an image corresponding to the object, or
an image of the predetermined space captured by the camera module and highlighting the object in the displayed image.

9. The control method according to claim 8, wherein the user request is performed by the natural language voice input by the user together with a gesture corresponding to at least one of a size and shape of the object,
wherein the gesture is captured by the camera module, and
wherein the controller is configured to calculate a size or shape of the object based on the gesture.

10. The control method according to claim 8, wherein the determining the position of the object includes determining a plurality of possible candidate positions of the object, and wherein the guide information includes displaying the plurality of possible candidate positions of the object in the form of separate graphic objects in the plane view of the predetermined space.

11. A system comprising:
a terminal, the terminal comprising:
a display unit; and
a camera module configured to capture an image of a predetermined space when a motion of a person is sensed from the predetermined space; and
a server configured to generate position information on one or more objects arranged in the predetermined space by using the captured image and storing the generated position information,
the terminal being configured to:
send a request to the server for the position of the one or more objects in response to a user request, and
output guide information for guiding the user to the position of the one or more objects in at least one of visual, auditory and tactile manners,
wherein the user request is performed by the user applying a touch input to a virtual keyboard displayed on the display unit or by a natural language voice input by the user to the terminal, and
wherein the guide information includes:
a plane view of the predetermined space with a graphic object at a point corresponding to the position of the one or more objects, wherein each graphic object is an image corresponding to a respective one of the one or more objects, or
an image of the predetermined space captured by the camera module and highlighting the one or more objects in the displayed image.

12. The system according to claim 11, wherein the camera module captures a first image of the predetermined space only if the motion of the person is sensed from the predetermined space and captures a second image of the predetermined space only if the motion of the person disappears, and the server generates the position information on the one or more objects by using the first and second images which are taken at their respective timing points.

13. The system according to claim 12, wherein the server detects an object among the one or more objects of which position is changed, from the predetermined space by comparing the first and second images with each other, and generates the position information for only the detected object.

14. The system according to claim 12, wherein the one or more objects are objects preset by a user input, and the server generates the position information for only the preset object.

15. The system according to claim 11, wherein the terminal sets the point where the terminal is located, to a departure place and sets the position of the one or more objects corresponding to the user request to an arrival place, and the guide information further comprises path guide information for guiding a path from the departure place to the arrival place.

16. The system according to claim 11, wherein the user request is performed by the natural language voice input by the user together with a gesture corresponding to at least one of a size and shape of the one or more objects,
wherein the gesture is captured by the camera module, and
wherein the terminal is configured to calculate a size or shape of the one or more objects based on the gesture.

17. The system according to claim 11, wherein the determining the position of the one or more objects includes determining a plurality of possible candidate positions of each object, and
wherein the guide information includes displaying the plurality of possible candidate positions of each object in the form of separate graphic objects in the plane view of the predetermined space.

* * * * *